(12) United States Patent
Campbell, Sr.

(10) Patent No.: US 12,409,523 B1
(45) Date of Patent: Sep. 9, 2025

(54) PORTABLE WOODWORKING SPINDLE FLUTING JIG AND METHOD OF USE

(71) Applicant: Mitchell D. Campbell, Sr., Burleson, TX (US)

(72) Inventor: Mitchell D. Campbell, Sr., Burleson, TX (US)

( * ) Notice: Subject to any disclaimer, the term of this patent is extended or adjusted under 35 U.S.C. 154(b) by 260 days.

(21) Appl. No.: 18/215,584

(22) Filed: Jun. 28, 2023

Related U.S. Application Data

(60) Provisional application No. 63/443,507, filed on Feb. 6, 2023.

(51) Int. Cl.
| | | |
|---|---|---|
| B23Q 16/00 | (2006.01) | |
| B23Q 16/02 | (2006.01) | |
| B27C 5/10 | (2006.01) | |

(52) U.S. Cl.
CPC .......... *B23Q 16/001* (2013.01); *B23Q 16/02* (2013.01); *B27C 5/10* (2013.01)

(58) Field of Classification Search
CPC .. B23Q 16/001; B23Q 16/02; B23Q 17/2233; B23Q 17/2428; B27C 5/00; B27C 5/10; B23B 49/00; B23B 3/065; B24B 23/028; G05B 2219/45229
USPC ...................................................... 144/371
See application file for complete search history.

(56) References Cited

U.S. PATENT DOCUMENTS

| | | | |
|---|---|---|---|
| 286,663 A | 10/1883 | Wheeler | |
| 2,059,753 A * | 11/1936 | Scott ...................... | B23Q 16/02 |
| | | | 269/69 |
| 2,549,490 A | 4/1951 | Chamberlain | |
| 3,186,257 A | 6/1965 | Budney et al. | |
| 4,275,777 A * | 6/1981 | Briggs .................... | B23D 59/00 |
| | | | 144/1.1 |
| 5,020,578 A * | 6/1991 | Jennings .................. | B27M 3/22 |
| | | | 269/304 |
| 7,094,012 B1 * | 8/2006 | Bang ........................ | B23Q 3/04 |
| | | | 269/309 |
| 9,289,868 B2 * | 3/2016 | Gray ........................ | B23Q 3/04 |
| 9,511,463 B1 * | 12/2016 | De Lessio ................ | B25H 1/18 |
| 2015/0174756 A1 * | 6/2015 | Firth ........................ | B25H 1/08 |
| | | | 83/477 |
| 2019/0275695 A1 * | 9/2019 | Grove ...................... | B23Q 3/18 |

FOREIGN PATENT DOCUMENTS

EP 0076839 A1 4/1983

* cited by examiner

*Primary Examiner* — Bobby Yeonjin Kim
(74) *Attorney, Agent, or Firm* — Richard Eldredge; Leavitt Eldredge Law Firm

(57) ABSTRACT

A spindle flute jig for woodworking is disclosed. The flute jig is freestanding and independent of woodworking lathes. The flute jig comprises a base, a carriage, an upper frame positioned substantially parallel to the base, a drive end, a pivot end, an adjustable plunge router stop, a fixed plunge router stop, a tool storage section, and a marking block.

2 Claims, 9 Drawing Sheets

PORTABLE WOODWORKING SPINDLE FLUTING JIG AND METHOD OF USE

CROSS REFERENCE TO RELATED APPLICATIONS

This application claims the benefit of U.S. Provisional Application 63/443,507, filed Feb. 6, 2023, of which is hereby incorporated by reference in its entirety.

BACKGROUND

1. Field of the Invention

The present invention relates generally to woodworking tools, and more specifically to a woodworking spindle fluting jig capable of allowing precise flute production on a wooden spindle.

2. Description of Related Art

Wooden spindles are often used to provide vertical support for stair railing, chairs, tables, and other types of furniture. Many wooden spindles incorporate decorative details to enhance their overall appearance such as flutes. Flutes are grooves that often run parallel to the spindle's long axis. Traditionally, flutes are cut by hand with a fluting chisel. This, however, requires a considerable amount of time and sophisticated carving skills to ensure equal spacing between each flute.

Accordingly, it is an object of the present invention to provide a portable woodworking. spindle fluting jig that addresses the limitations discussed above.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
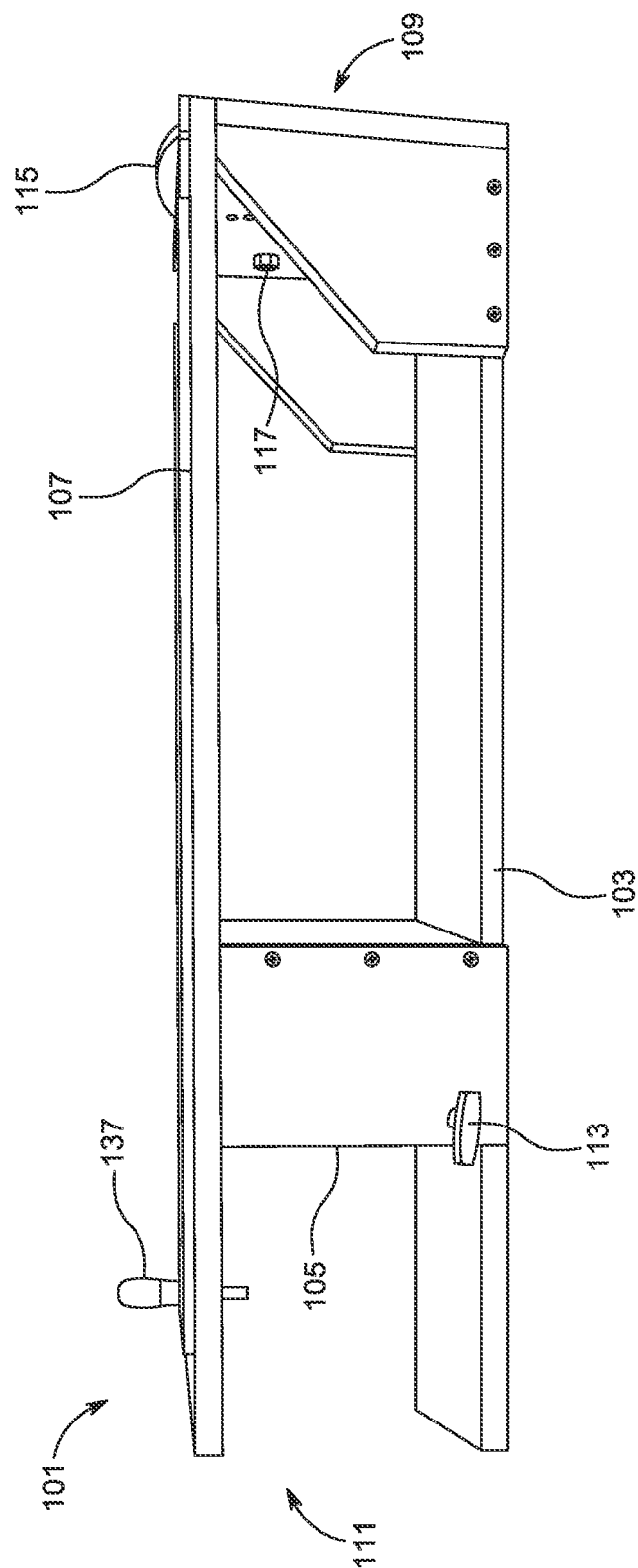
FIG. 1 is a profile view of a woodworking spindle fluting jig in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional woodworking tools. Specifically, the present invention provides for a woodworking spindle fluting jig that is designed to hold a wooden spindle so that a cutting tool such as a plunge router can be employed to make flutes on the spindle with precision. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 through 8 depict several views of a woodwork spindle fluting jig 101 in accordance with a preferred embodiment of the present application.

In the contemplated embodiment, the fluting jig 101 includes a base 103, a carriage 105, an upper frame 107, a drive end 109, and a pivot end 111. The upper frame 107 runs substantially parallel to the base 103 and is supported by the carriage 105 and the drive end 109.

The carriage 105 is configured to slide along the base 103 and the upper frame 107 to accommodate the length of a spindle 601, and is locked into place via a plurality of carriage locks 113.

The drive end 109 includes an indexing wheel 115 secured thereto via an index drive 117. It should be understood that the index drive 117 corresponds with an end of a lathe drive (not shown). The drive end 109 also includes a plurality of indexing drive holes 119 and a plurality of indexing holes 121. The indexing drive holes 119 allows a spindle of varying sizes to be accommodated within the fluting jig 101. The indexing holes 121 are aligned with the indexing drive holes 119. The index wheel 115 includes a plurality of indexing wheel holes 125 for enabling equally spaced lines on a turning. An indexing pin 127 is inserted into an indexing wheel hole 125 through an indexing hole 121 to secure the desired index in place.

The pivot end 111 includes a plurality of pivot adjustment holes 129 that align with the indexing drive holes 119.

The fluting jig 101 also includes an adjustable plunge router stop 131 and a fixed plunge router stop 133. The adjustable router stop 131 is positioned over the pivot end 111 and runs perpendicular across the upper frame 107. The fixed router stop 133 is mounted over the drive end 109 and runs perpendicular across the upper frame 107. During use, the base of a plunge router (not shown) makes contact with both the adjustable router stop 131 and the fixed router stop 133 at the opposing ends of the fluting jig 101. The adjustable router stop 131 allows the user to adjust where flute carving begins from the end of a spindle. The fixed router stop 133 is configured to prevent the plunge router from dislodging off of the drive end 109. It should be appreciated that the distance from the end of a spindle on the drive end 109 to the initial flute carving on the pivot end 111 can also be adjusted by placing a strip of wood of a predetermined width perpendicular across the top and in front of the fixed router stop 133.

The fluting jig 101 also includes guide rails (not shown) configured to guide the base of the plunge router down the length of the fluting jig 101. The guide rails are adjustable on each side of the fluting jig 101. It should be appreciated that the guide rails are slotted at the fasteners to allow them to move toward or away from each other to accommodate various base diameters of plunge routers.

Figure 2:
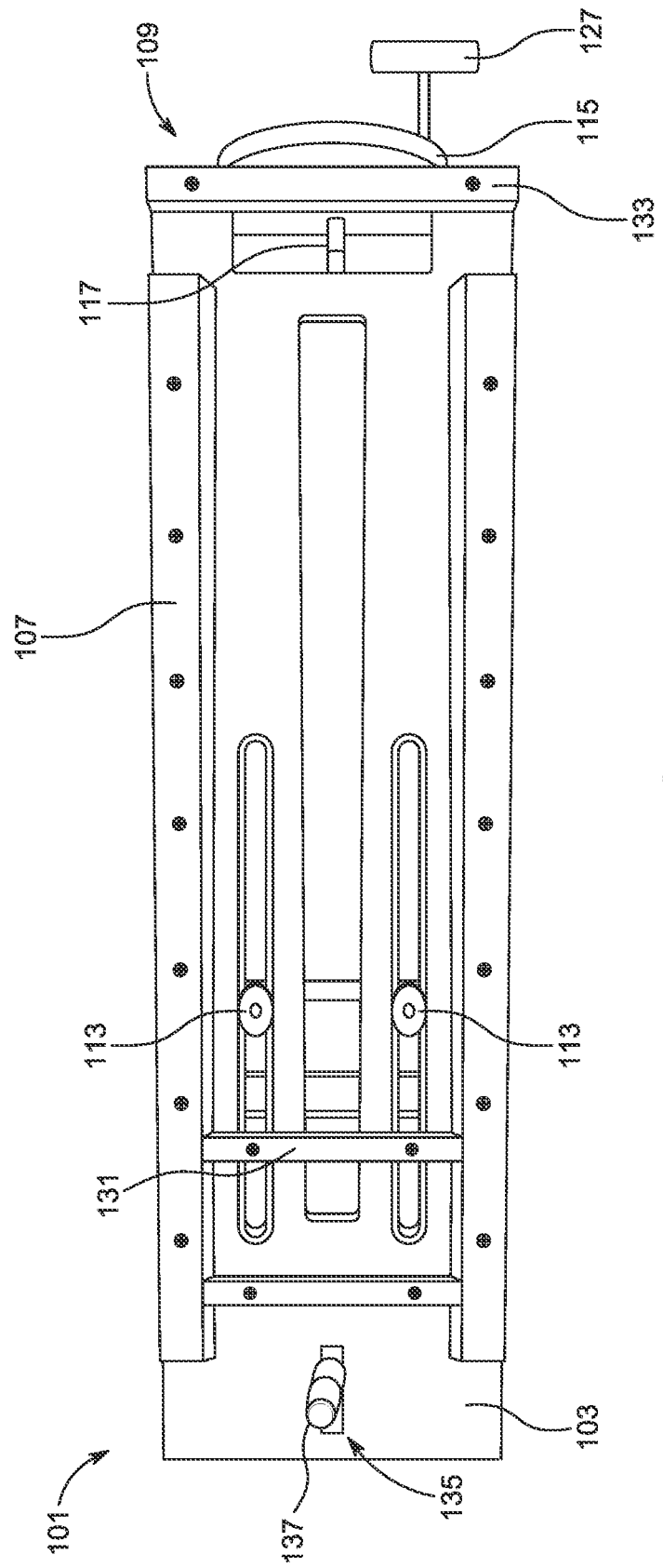
FIG. 2 is a top view of the fluting jig of FIG. 1.
Figure 3:
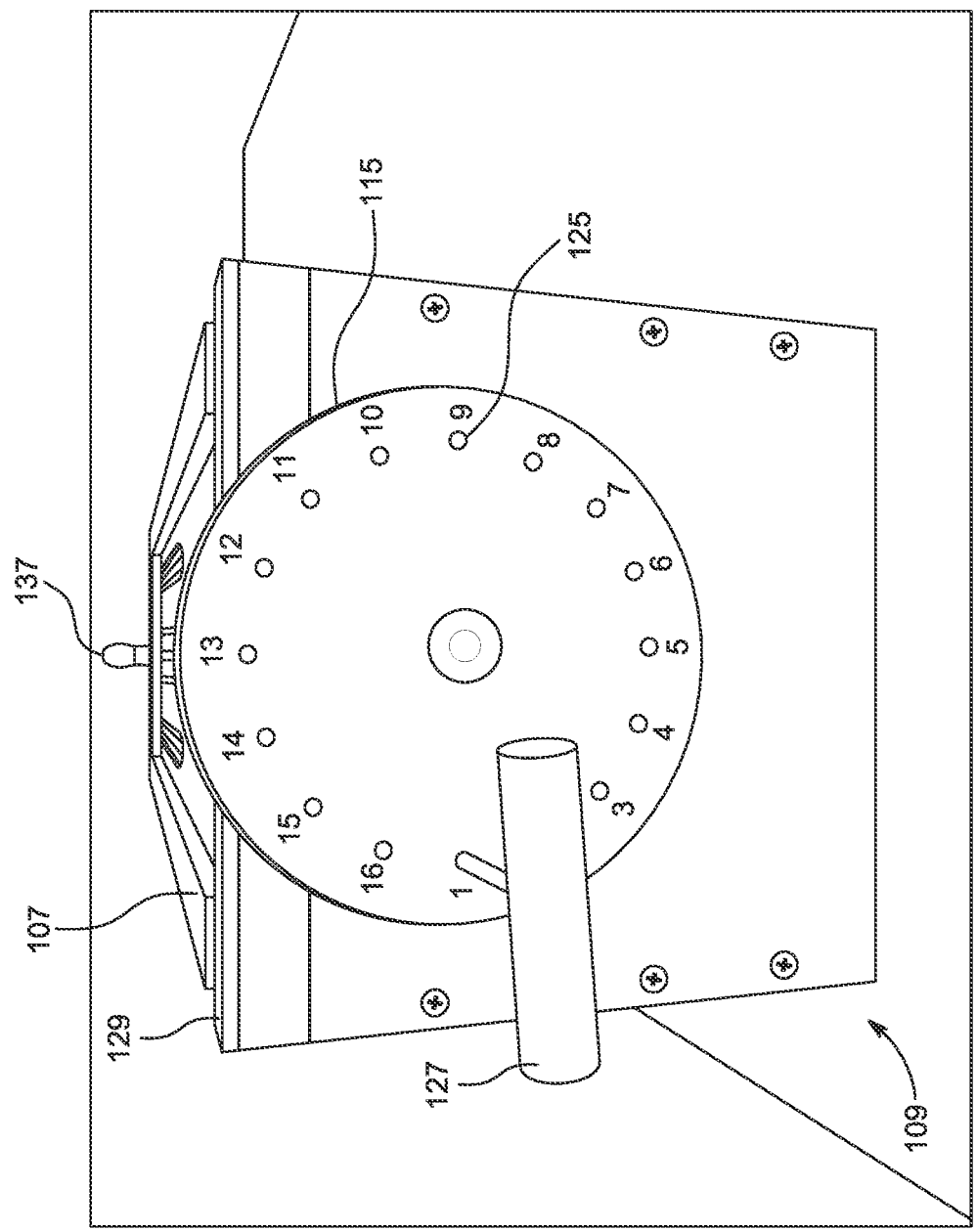
FIG. 3 is a front perspective view of the drive end of FIG. 1.
Figure 4:
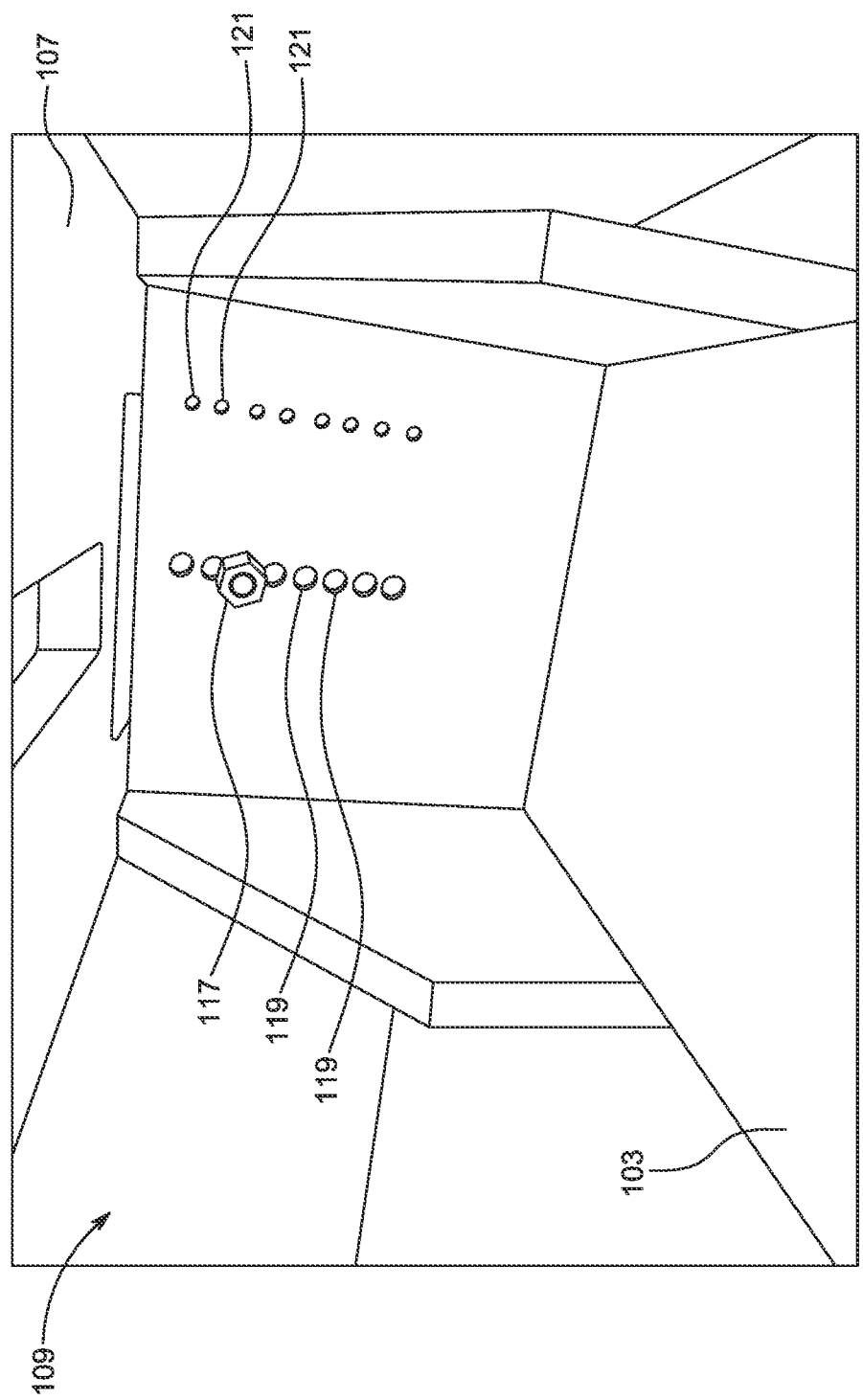
FIG. 4 is a closeup underside view of the drive end of FIG. 3.
Figure 5:
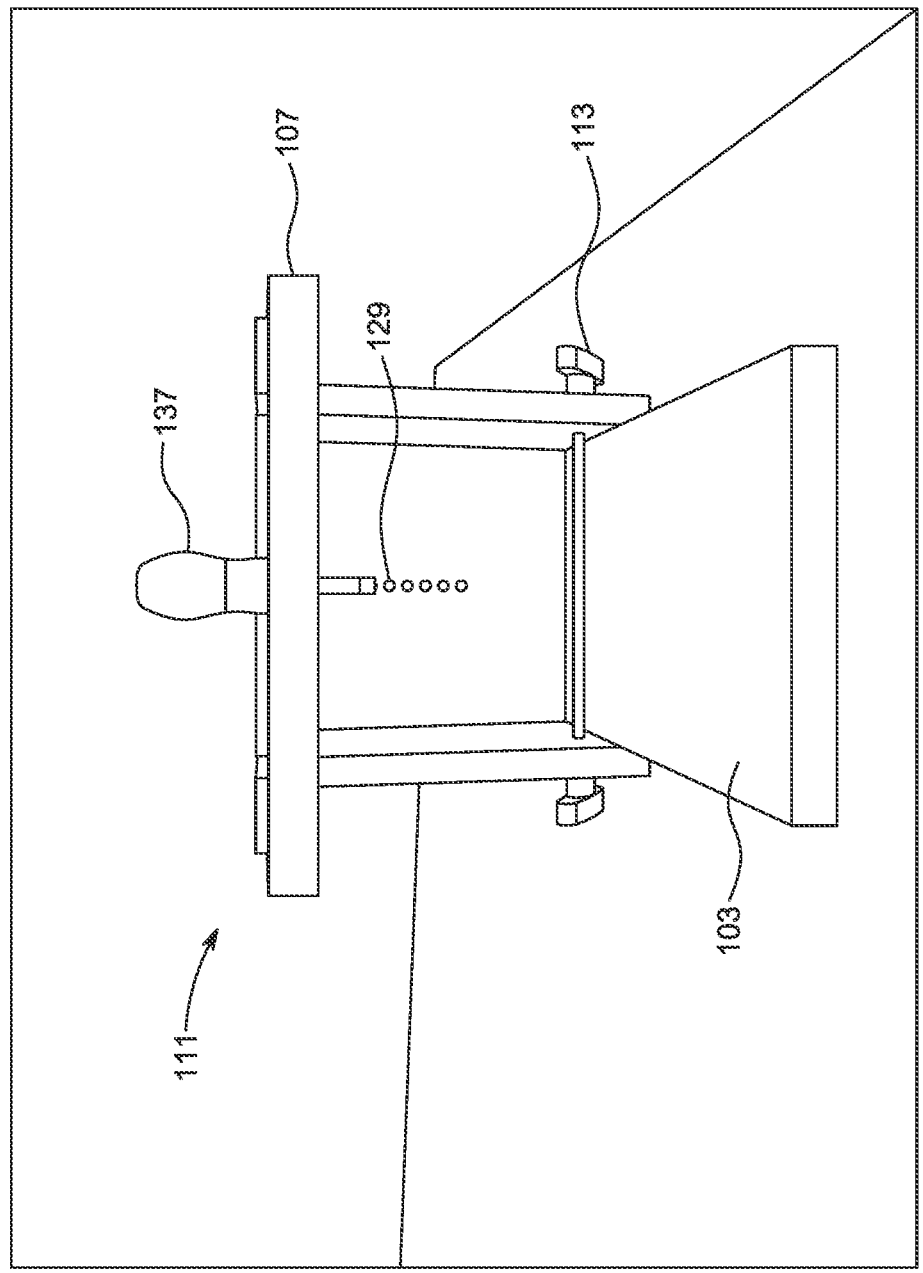
FIG. 5 is a front perspective view of the pivot end of FIG. 1.
Figure 6:
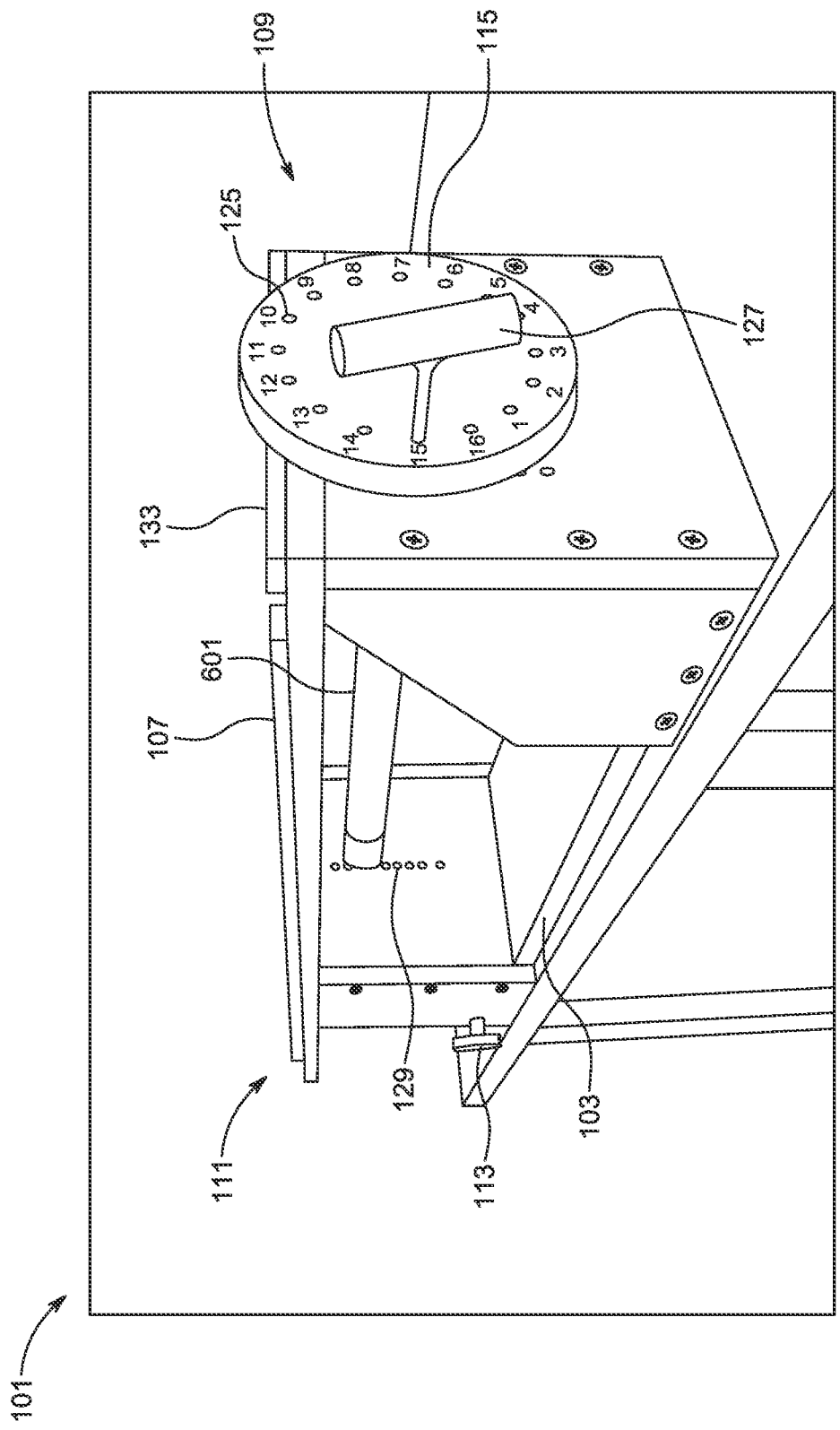
FIG. 6 is a side perspective view of the fluting jig of FIG. 1, illustrating a plunge router mounted thereon to perform fluting production on a spindle.
Figure 7:
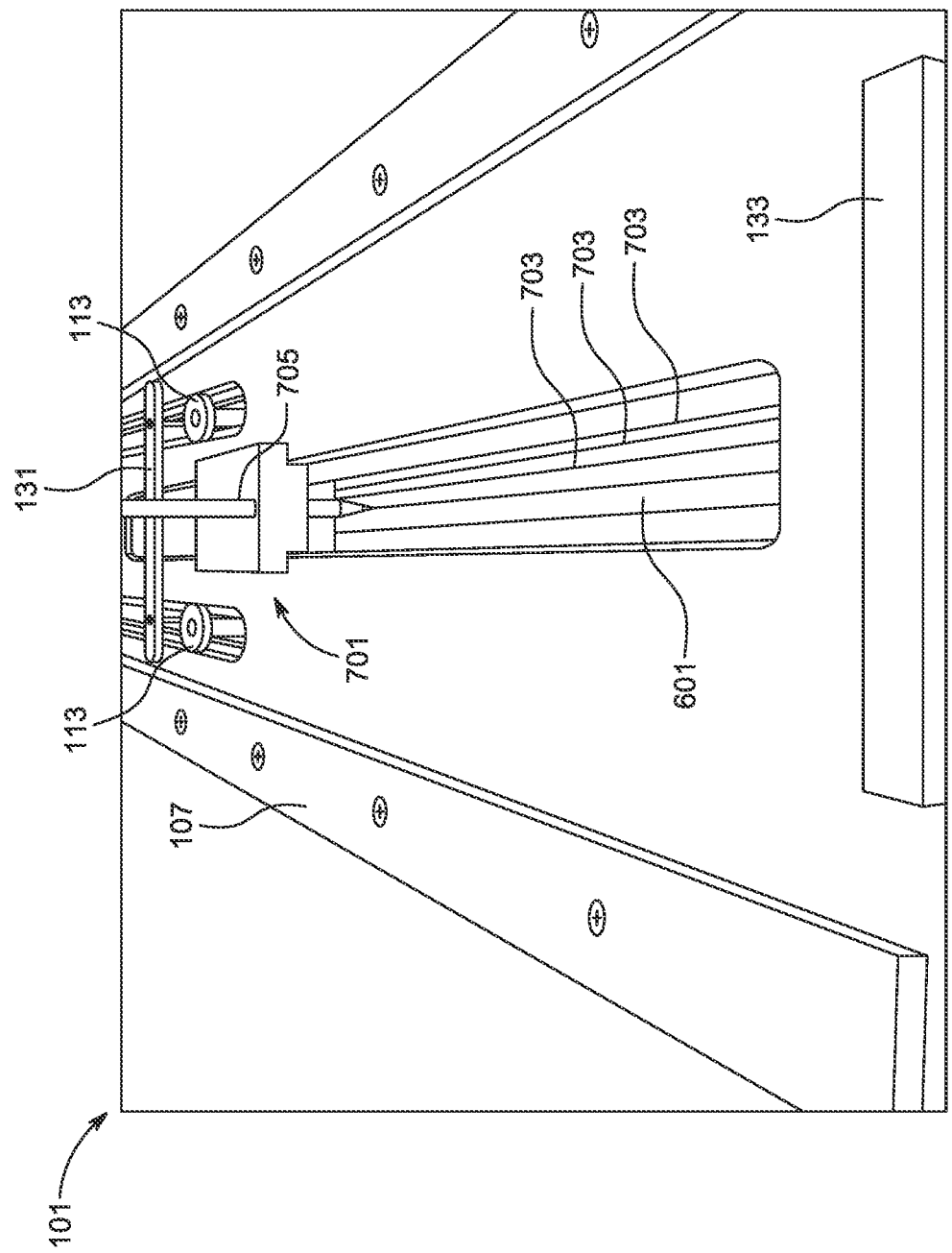
FIG. 7 is a top perspective view of the fluting jig of FIG. 6, illustrating a marking block.
Figure 8:
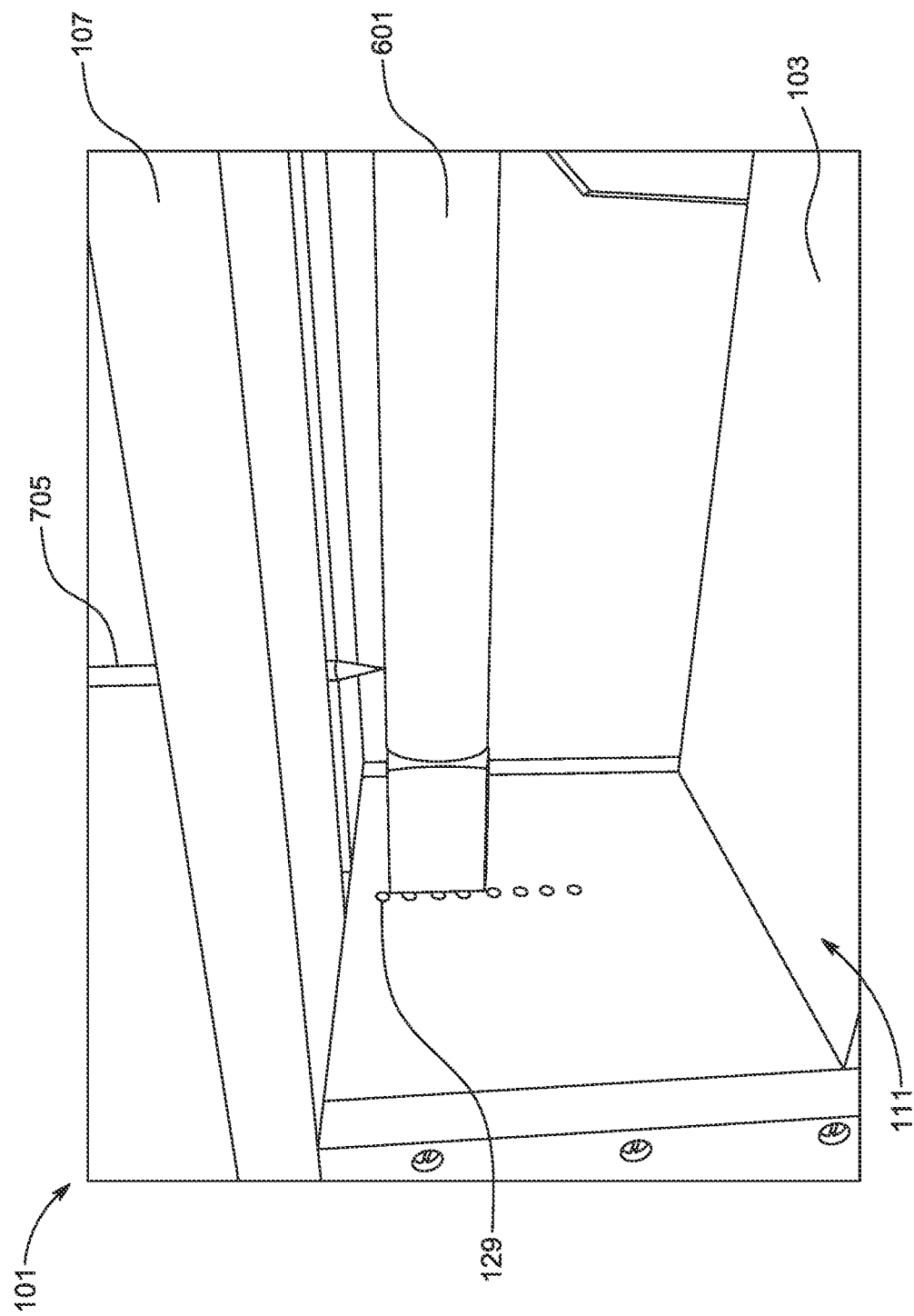
FIG. 8 is a closeup underside view of the fluting jig of FIG. 6, illustrating equally spaced linear lines created by the marking block of FIG. 7.

The fluting jig 101 also includes a front router stop 133 as shown in FIGS. 2 and 7. This router stop is fixed and prevents the router from being pulled accidentally from the jig. The fluting jig 101 also includes a read adjustable stop 131 as shown in FIGS. 2 and 7. This gives the woodworker the ability to adjust where the flutes will start from the end of the spindle.

The fluting jig 101 also includes a tool storage section 135 for storing various tools therein such as a screwdriver 137.

The fluting jig 101 further includes a marking block 701 configured to mark equally spaced lines 703 along the length of and around the circumference of a spindle 601 via marking implement 705, such as a pencil. The marking block 701 is inserted on top of the fluting jig 101 with the marking implement 705 resting on the spindle. The user can slide the marking block 701 from back to front, creating a line on the spindle. The user can also turn the indexing wheel 115 to the desired number of lines required around the spindle 601. It should be appreciated that this allows the production of spiral-type of spindles or legs which can then be transferred to a woodworking lathe to complete.

It should be appreciated that the fluting jig can be used to cut a single flute on each side of a square spindle.

It should also be appreciated that one of the unique features believed characteristic of the present application is that the fluting jig 101 is freestanding and is independent from a woodworking lathe. Other similar jigs are mounted to a lathe with indexing capabilities. Spindles turned on lathes without the benefit of an indexing wheel can be inserted into the fluting jig 101 to cut the desired flutes. In addition, wood spindles can also be purchased and inserted into the fluting jig 101 for users without a woodworking lathe.

Figure 9:
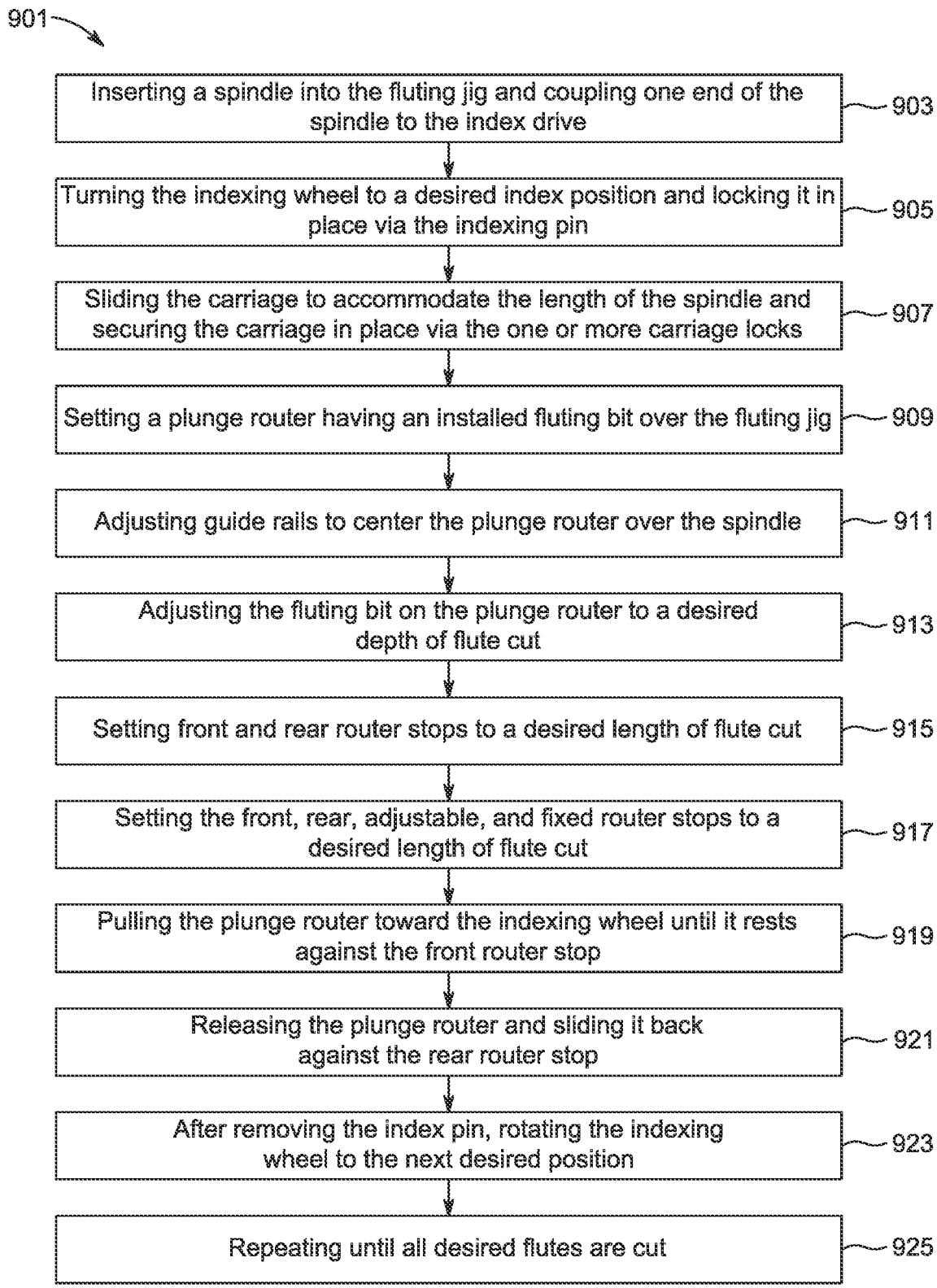
FIG. 9 is a flowchart of a method of use of the fluting jig of FIG. 1.

In FIG. 9, a flowchart 901 depicts a method of use of the fluting jig 101. First, a spindle is inserted into the fluting jig with one end coupled to the index drive, as shown with box 903. Next, the indexing wheel is turned to a desired index position and is locked in place via the indexing pin, as shown with box 905. The carriage is slid to accommodate the length of the spindle and the carriage is secured in place via the one or more carriage locks, as shown with box 907. A plunge router having an installed fluting bit can be set over the fluting jig, as shown with box 909.

Guide rails are then adjusted to center the plunge router over the turned spindle, as shown with box 911. The fluting bit is adjusted using the plunge stop feature on the router to the desired depth of the flute cut, as shown with box 913. The front, rear, adjustable, and fixed router stops are set to the desired length of the flute cut, as shown with box 915.

The plunge router is then set against the rear stop and is used to plunge into the desired depth, as shown with box 917. Next, the plunge router is pulled toward the indexing wheel until it rests against the front router stop, as shown with box 919. The plunge router is then released and slid back against the rear router stop, as shown with box 921. After removing the indexing pin, the indexing wheel is rotated to the next desired position and secured with the indexing pin, as shown with box 923. The user can repeat these steps until all desired flutes are cut, as shown with box 925

It should be understood that before cutting flutes into a spindle, the number of flutes desired is based on the diameter of the spindle. For example, for larger diameter spindles, as many as 16 flutes evenly spaced around the turned spindle can be cut. In another example, for smaller diameter spindles, every other indexing hole can be skipped The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A spindle fluting jig for woodworking, comprising:
   a base;
   a carriage;
   an upper frame positioned substantially parallel to the base;
   a drive end, the drive end having:
     an index wheel secured thereto via an index drive;
     a plurality of indexing drive holes; and
     a plurality of indexing holes;
     wherein the plurality of indexing drive holes and the plurality of indexing holes are aligned therebetween;

a pivot end, the pivot end having:
  a plurality of pivot adjustment holes aligned with the plurality of indexing drive holes;
an adjustable plunge router stop positioned over the pivot end and extended perpendicularly across the upper frame, the adjustable plunge router stop configured to allow the user to adjust where flute carving begins from an end of a spindle;
a fixed plunge router stop mounted over the drive end and extended perpendicularly across the upper frame, the fixed plunge router stop configured to prevent a plunge router from dislodging off of the drive end;
a fixed front plunge router stop that prevents the router from being pulled accidentally from the jig;
an adjustable rear plunge router stop that gives the woodworker the ability to adjust where the flutes will start from the end of the spindle;
a pair of guide rails configured to guide a base of a plunge router down a length of the fluting jig and configured to accommodate one or more base diameters of a plunge router;
a tool storage section for storing one or more tools therein; and
a marking block configured to mark a plurality of equally spaced lines along a length of and around a circumference of a spindle via marking implement;
wherein the upper frame runs substantially parallel to the base and is supported by the carriage and the drive end;
wherein the carriage is configured to slide along the base and the upper frame to accommodate a length of a spindle and is locked into place via a plurality of carriage locks.

2. A method of producing flutes on a spindle, the method comprising:
  providing a spindle fluting jig, the spindle fluting jig comprising;
    a base;
    a carriage;
    an upper frame positioned substantially parallel to the base;
    a drive end, the drive end having:
      an index wheel secured thereto via an index drive;
      a plurality of indexing drive holes; and
      a plurality of indexing holes;
      wherein the plurality of indexing drive holes and the plurality of indexing holes are aligned therebetween;
    a pivot end, the pivot end having:
      a plurality of pivot adjustment holes aligned with the plurality of indexing drive holes;
    an adjustable plunge router stop positioned over the pivot end and extended perpendicularly across the upper frame, the adjustable plunge router stop configured to allow the user to adjust where flute carving begins from an end of a spindle;
    a fixed plunge router stop mounted over the drive end and extended perpendicularly across the upper frame, the fixed plunge router stop configured to prevent a plunge router from dislodging off of the drive end;
    a fixed front plunge router stop that prevents the router from being pulled accidentally from the jig;
    an adjustable rear plunge router stop that gives the woodworker the ability to adjust where the flutes will start from the end of the spindle;
    a pair of guide rails configured to guide a base of a plunge router down a length of the fluting jig and configured to accommodate one or more base diameters of a plunge router;
    a tool storage section for storing one or more tools therein; and
    a marking block configured to mark a plurality of equally spaced lines along a length of and around a circumference of a spindle via marking implement;
    wherein the upper frame runs substantially parallel to the base and is supported by the carriage and the drive end;
    wherein the carriage is configured to slide along the base and the upper frame to accommodate a length of a spindle and is locked into place via a plurality of carriage locks;
  inserting a spindle into the spindle fluting jig and coupling one end of the spindle to the index drive;
  turning the index wheel to a desired index position and locking said desired index position via the indexing pin;
  sliding the carriage to accommodate a length of the spindle;
  securing the carriage in place via the one or more carriage locks;
  setting a plunge router having an installed fluting bit over the spindle fluting jig;
  adjusting the guide rails to center the plunge router over the spindle;
  adjusting the fluting bit on the plunge router to a desired depth of flute cut;
  setting the front, rear, adjustable, and fixed router stops to a desired length of the flute cut;
  setting the plunge router against the rear stop and using said plunge router to plunge into the desired depth;
  pulling the plunge router toward the index wheel until said plunge router rests against the front router stop;
  releasing the plunge router and sliding said plunge router against the rear router stop;
  after removing the index pin, rotating the indexing wheel to another desired position; and
  repeating until all desired flutes are cut.

* * * * *